US005917829A

United States Patent [19]

Hertz et al.

[11] Patent Number: 5,917,829

[45] Date of Patent: Jun. 29, 1999

[54] ASYNCHRONOUS CDMA DECORRELATING DETECTOR

[75] Inventors: David Hertz, Kiryat Motzkin; Harvey J. Greenberger, Kiryat Tivon, both of Israel

[73] Assignee: State of Israel-Ministry of Defense, Rafael - Armament Development Authority, Haifa, Israel

[21] Appl. No.: 08/980,766

[22] Filed: Dec. 1, 1997

[30] Foreign Application Priority Data

Dec. 4, 1996 [IL] Israel ........................................ 119752

[51] Int. Cl.[6] ........................................ H04J 13/00

[52] U.S. Cl. ........................................ 370/479

[58] Field of Search ........................................ 370/320, 335, 370/342, 441, 479, 515

[56] References Cited

U.S. PATENT DOCUMENTS

| | | | |
|---|---|---|---|
| 4,475,186 | 10/1984 | Gutleber . | |
| 4,845,726 | 7/1989 | Kurihara et al. . | |
| 4,908,836 | 3/1990 | Rushforth et al. . | |
| 5,442,627 | 8/1995 | Viterbi et al. . | |
| 5,477,195 | 12/1995 | Spilker . | |
| 5,506,861 | 4/1996 | Bottomley | 375/200 |
| 5,533,047 | 7/1996 | Mourot et al. . | |
| 5,544,155 | 8/1996 | Lucas et al. . | |
| 5,553,062 | 9/1996 | Schilling et al. . | |
| 5,615,209 | 3/1997 | Bottomley | 370/342 |
| 5,638,376 | 6/1997 | Miki et al. | 370/342 |
| 5,671,221 | 9/1997 | Yang . | |
| 5,671,248 | 9/1997 | Chau et al. . | |

FOREIGN PATENT DOCUMENTS 599 553 A2 11/1993 European Pat. Off. .

OTHER PUBLICATIONS

Verdu, S., "Adaptive Multiuser Detection", *Third Int'l. Symposium on Spread Spectrum Techniques and Applications, IEEE ISSSTA*, N.Y. 1994, vol. 1, pp. 43–50.

De Gaudenzi et al, "Advances in Satellite CDMA Transmission for Mobile and Personal Communications", Proc. Of IEEE, 84(1): 18–39, 1996.

Moshavi, S., "Multi–User Detection for DS–CDMA Communications", IEEE *Communications Magazine*, pp. 124–136, Oct. 1996.

*Primary Examiner*—Huy D. Vu
*Assistant Examiner*—Alexander Boakye
*Attorney, Agent, or Firm*—Mark M. Friedman

[57] ABSTRACT

Method and apparatus for optimally decoding messages from CDMA signal sent by a plurality of users and received asynchronously at one receiver, using a minimal number of computations and minimal memory and processing resources. It is based on a novel approach to signal correlation, as well as to subsequent decoding by decorrelation, that requires a correlation period of only one symbol length, by providing for each user a pair of partial signatures sequences, with which the signal is correlated, deccorelating the results with the inverse of the cross-correlation matrix of all partial sequences, and combining the resultant partial symbol estimates—to obtain final estimated symbol values. The partial sequences are formed by separating each original sequence at a point corresponding to the estimated symbol boundary time, relative to an arbitrary correlation window, of one symbol length. The method can be modified to also apply to the case that any of the signals is received over multiple paths, any path possibly undergoing Doppler shift.

16 Claims, 6 Drawing Sheets

ASYNCHRONOUS CDMA DECORRELATING DETECTOR

FIELD AND BACKGROUND OF THE INVENTION

The present invention relates to a detector for signals sent in Code Division Multiple Access mode and, more particularly, to a method and apparatus for detecting messages from a plurality of asynchronous direct-sequence CDMA signals by decorrelation.

There is an increasing prevalence of centralized multi-user radio communication systems, such as cellular telephone systems, that use Code Division Multiple Access (CDMA) signal coding methods, in general, and direct-sequence CDMA, in particular. The latter method can be briefly described as follows:

To create K simultaneous sub-channels (one sub-channel per active user) within a given radio frequency band, each sub-channel is assigned a unique sequence, also referred to as code or signature, of N bipolar pulses, also referred to as chips. The K sequences are generally designed so as to be maximally distinguishable from each other at all relative delays between them. During transmission within any such sub-channel, the assigned sequence is usually repeated periodically, each repetition forming one information-carrying symbol. A transmitter modulates each symbol according to the information to be transmitted. In the discussion to follow and in illustrating the invention, the modulation is assumed to be binary valued, or based on M-Phase-Shift Keying (MPSK), but other modulation schemes, such as Quadrature Amplitude Modulation (QAM), are applicable as well. In the case of simple binary modulation, each symbol carries one bit of information. As an illustrative example, if the signature of a particular sub-channel is [011101] (where 0 and 1 denote the two respective polarities) and if the information sequence to be transmitted is [101 . . . ], then the transmitted sequence will be

[011101,100010,011101, . . . ].

Generally, many sub-channels may be active simultaneously, so that their respective sequences are, in effect, mixed together within the same RF band. The number of sub-channels active at any one time may vary, depending on the usage and therefore it is customary to refer to users, rather than to sub-channels; thus the term users will also be used in the sequel in reference to individual signals and sequences.

In the receiver, it is the task of a detector to detect, within the received signal, the sequence belonging to one or more particular users and to extract the transmitted information therefrom. The detection is commonly done by means of correlators—one for each user. A correlator, in effect, correlates the received signal with the respective signature sequence. The results of the correlation operations are then processed so as to obtain the information (e.g. bit value) carried by each symbol of the respective users.

The situation to be discussed, and the one to which the invention is particularly applicable, is that of the so-called uplink channel in a centralized communication system, that is—the transmission of signals from individual stations, or users, to a central station, which must receive and detect the information from all the users. This situation is generally and primarily characterized by a lack of synchronization between the various sub-channel sequences; that is—the points of time at which a new symbol (i.e. signature sequence repetition cycle) starts are not coincident in all sub-channels, since these times are independently determined by the various transmitters. A typical time relationship, in the case of four users, is illustrated in FIG. 1, which depicts typical symbol streams corresponding to the four users, where each double-arrowed line represents the duration of one symbol. The situation is usually also characterized by large variations of the amplitudes among the various signals, which is primarily due to the disparate distances of the transmitters from the central station. For a recent survey paper on the problems and prior-art solutions of asynchronous signal detection, the reader is referred to S. Moshavi, "Multi-User Detection for DS-CDMA Communications," IEEE Communications Magazine, October 1996, pp. 124–136.

It has been shown in the literature (for example, in the above referenced article or in Section 3 of "Adaptive Multi-user Detection" by Sergio Verdu; Third International Symposium on Spread Spectrum Techniques and Applications, IEEE ISSSTA, New York 1994, Vol. 1 pp 43–50) that in the synchronous case, optimal detection of any or all signals is obtained by applying a decorrelation operation on the outputs of the correlators. That is, the vector of output values is multiplied by the inverse of a correlation matrix, to obtain the vector of signal values; the correlation matrix is the matrix of correlation values of all possible pairs of signature sequences. Note, however, that in the synchronous case the signature sequences can be chosen to be orthogonal to each other (e.g. the rows of a Hadamard matrix) thus resulting in a correlation matrix proportional to the unit matrix.

Various attempts have been made to apply a similar approach under the reception situation described above, that is—to the asynchronous case, by using a correlation matrix based on signature sequences in relative time relationship similar to those of the received signals. The time relations between the signals is independently obtained; according to one practice, for example, certain training signals are sent from time to time, which enable the receiver to acquire the timing of the symbols, as well as their complex amplitudes. The remaining problem is how to extract the individual symbol information, that is, the symbol values, from the resultant signal values, in the face of the asynchronous symbol timing.

One general method for extracting (or detecting) the information, according to prior art, is exemplified by the teaching of European patent 0 599 553 A2. Accordingly, decorrelation is performed on correlation signals obtained from the outputs of the correlators over a block whose duration is M symbols. The block of M symbols for all the K users is processed in a single step.

The above method has a major practical disadvantage: The size of the decorrelation matrix is very large, namely MK×MK, and thus is lengthy to compute (which must be done fairly frequently, because of changing user parameters and activity status); the number of computations involved in inverting the correlation matrix increases as some power of its size. Even more disadvantageously, the method continuously requires a large number of decorrelation computations for each symbol detected. Reducing M usually results in an increasing BER (bit error rate). Moreover, this method involves a great degree of overlap between successive computations—which greatly increases the overall memory requirements and computational load, and there is some information lost at the ends of each block.

There is thus a widely recognized need for, and it would be highly advantageous to have, a decorrelating detector for a multiplicity of asynchronously received CDMA signals that would yield detected information with low BER at a relatively small computational effort.

SUMMARY OF THE INVENTION

The present invention successfully addresses the shortcomings of the presently known configurations by providing a method for optimally decoding messages from CDMA signals sent by a plurality of users and received asynchronously at one receiver, using a minimal number of computations and minimal memory and processing resources.

The present invention discloses a novel approach to signal correlation, as well as to subsequent decoding by decorrelation, that requires a correlation period of only one symbol length, by providing for each user a pair of partial signature sequences, with which the signal is correlated, estimating symbol values based on results of these correlations and combining the estimates into final detected values.

More specifically, the method of the present invention, sets up a correlation window of exactly one symbol duration, T, which begins at an arbitrary point of time and is repeated indefinitely. It provides for detecting all currently active signals and for estimating, for each one, the time of any intersymbol boundary relative to the just preceding beginning of a correlation window; this time is termed symbol delay, $\tau$. It then generates, for each active user, from his signature sequence, a pair of partial signature sequences, each of length T and composed of two parts; the first part is of length $\tau$ and the other part—of length $T-\tau$. In one of these sequences, termed head sequence, the first part is uniformly zero, while the second part is identical to an equally long first (head) portion of the signature sequence; conversely, in the other partial sequence of the pair, the first part is identical to the remaining (tail) portion of the signature sequence, while the second part is uniformly zero. The total received signal is then correlated with each of the partial signature sequences over each correlation window, yielding, for K active users, 2K correlation values.

The resultant correlation values can now be regarded as providing 2K equations for 2K partial symbol values in synchronously received signals and can therefore be solved completely preferably by decorrelation. According to the disclosed method, a decorrelation matrix is constructed, by inverting the matrix formed by cross-correlating all 2K partial signature sequences. This decorrelation matrix is applied to the obtained correlation values, to yield 2K partial estimates for K symbol values at a time. Each pair of partial estimates, which is obtained from adjacent correlation windows, is then combined, at relative weights of $T-\tau$ and $\tau$, to yield a final estimate of the symbol value. Finally, the actual information carried by the symbol is extracted by normalizing the obtained value with respect to the received complex amplitude (which is independently extracted for each user).

The method can also be applied, with some modification, to the case that any of the signals is received over multiple paths, where any path may, furthermore, undergo Doppler frequency shift. In this case, the partial signature sequences for such a signal are computed as weighted averages of partial signature sequences constructed for the signal arriving over each path, with its estimated symbol delay and, possibly, Doppler shift.

According to the present invention, there is thus provided a method for detecting transmitted messages in signals received by one receiver from a plurality of users within a CDMA transmission system, each user being characterized by a unique one of a plurality of signature sequences, all the signature sequences having an equal and constant duration T, each received signal consisting of consecutive symbols, each being of duration T and carrying a message value, the points of time of the beginning and end of each symbol constituting symbol boundaries, each received signal being associated with a complex amplitude and a delay, the delay being the time span between a common arbitrary point of time and a symbol boundary, and the received signals, in addition to reception noise, collectively forming a total received signal, the method comprising the steps of (a) defining a temporal sequence of consecutive correlation windows of duration T each, the beginning and end of each correlation window constituting correlation window boundaries;

(b) detecting, within the total received signal, signals sent by users, each detected signal being identified in terms of its signature sequences and associated with a corresponding user, this user being an active user;

(c) for each of the detected signals, deriving from the total received signal an estimated symbol delay, $<\tau>$, associated with the corresponding active user, the estimated symbol delay being the estimated duration of time from any one of the correlation window boundaries to the next occurring symbol boundary;

(d) partitioning each signature sequence that corresponds to one of the active users exactly into a head portion and a tail portion, the tail portion preceding the head portion and the duration of the tail portion being essentially equal to the corresponding estimated symbol delay;

(e) constructing for each of the active users a pair of partial sequences of duration T each, one of the partial sequences being a tail sequence and the other one being a head sequence, each of the partial sequences consisting of a leading portion and a succeeding trailing portion, whereby the leading portion of the tail sequence is essentially identical to the tail portion of the corresponding signature sequence, the trailing portion of the head sequence is essentially identical to the head portion of the corresponding signature sequence and the other portion of each of the partial sequences is uniformly zero;

(f) for each of the active users, correlating the total received signal, over the span of each of the correlation windows, with one or both of the corresponding pair of the partial sequences, the result being one or two corresponding series of correlation values; and (g) calculating from the correlation values, obtained for a plurality of users, estimated message values of symbols in received signals corresponding to one or more of the active users.

According to further features of the invention described below, the method further comprises the step of constructing a decorrelation matrix based on the partial sequences and step ‘g’ includes multiplying the correlation values by appropriate elements of the decorrelation matrix, to obtain one or two partially estimated values for each symbol, then weight averaging any such pairs of values in proportion to $T-<\tau>$ and $<\tau>$.

According to still further features of the invention, in step ‘c’ of the method, the deriving includes the substeps of (i) obtaining consecutive samples of the total received signal over a plurality of symbol lengths, the spacing of the samples being a sufficiently high sub-multiple of T;

(ii) obtaining samples of the corresponding signature sequence at a spacing equal to that of the samples of substep ‘i’;

(iii) deriving a sampled correlation function between the samples of substep 'i' and the samples of substep 'ii' for all possible time relations therebetween;

(iv) summing all samples of the correlation function that are spaced exactly T apart, for all possible time relations between the samples and any of the correlation windows; and (v) determining the particular one of the time relations of substep 'iv' for which the sum is greatest.

The present invention also provides an apparatus for detecting transmitted messages in signals received in one receiver from a plurality of users within a CDMA transmission system, which comprises:

(a) a preprocessor operative to (i) determine a temporal sequence of consecutive correlation windows of length T each, the beginning and end of each correlation window constituting window boundaries;

(ii) identify users in terms of their signature sequences, each thus identified user being an active user;

(iii) derive from the total received signal, for each of the active users, an estimated symbol delay, $<\tau>$, associated with the corresponding received signal, the estimated symbol delay being the estimated length of time from any one of the window boundaries to the next occurring symbol boundary;

(iv) partition each signature sequence that corresponds to one of the active users exactly into a head portion and a tail portion, the tail portion preceding the head portion and the duration of the tail portion being essentially equal to the corresponding one of the estimated symbol delays;

(v) construct, for each of the active users, a pair of partial sequences of length T each, one of the partial sequences being a tail sequence and the other one being a head sequence, each of the partial sequences consisting of a leading portion and a succeeding trailing portion, whereby the leading portion of the tail sequence is essentially identical to the tail portion of the corresponding signature sequence, the trailing portion of the head sequence is essentially identical to the head portion of the corresponding signature sequence and the other portion of each of the partial sequences is uniformly zero; and (vi) construct a decorrelation matrix based on the partial sequences, (b) a correlation processor operative, for each active user whose symbols are to be detected, to inner-vector multiply the total received signal, over the span of each of the correlation windows, by each of the corresponding pair of the partial sequences, and to sum the products of each such multiplication, to yield a respective pair of correlation values.

(c) a detection processor operative on a plurality of the correlation values to (i) multiply the correlation values by appropriate elements of the decorrelation matrix, yielding, for any of the active users and for each symbol in the corresponding received signal, two partially estimated symbol values, (ii) weight-average the partially estimated values for each symbol; and (iii) calculate therefrom estimated message values of symbols in signals received from users.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and apparatus for reliably detecting information transmitted asynchronously over a plurality of CDMA sub-channels, which requires relatively few computations.

Specifically, the present invention can be used to detect such information within the total received signal by means of a bank of correlators, followed by a bank of decorrelators, followed, in turn, by a bank of combiners that operate each on at most two successive sub-symbols at a time.

The principles and operation of a decorrelating detector according to the present invention may be better understood with reference to the drawings and the accompanying description.

Figure 1:
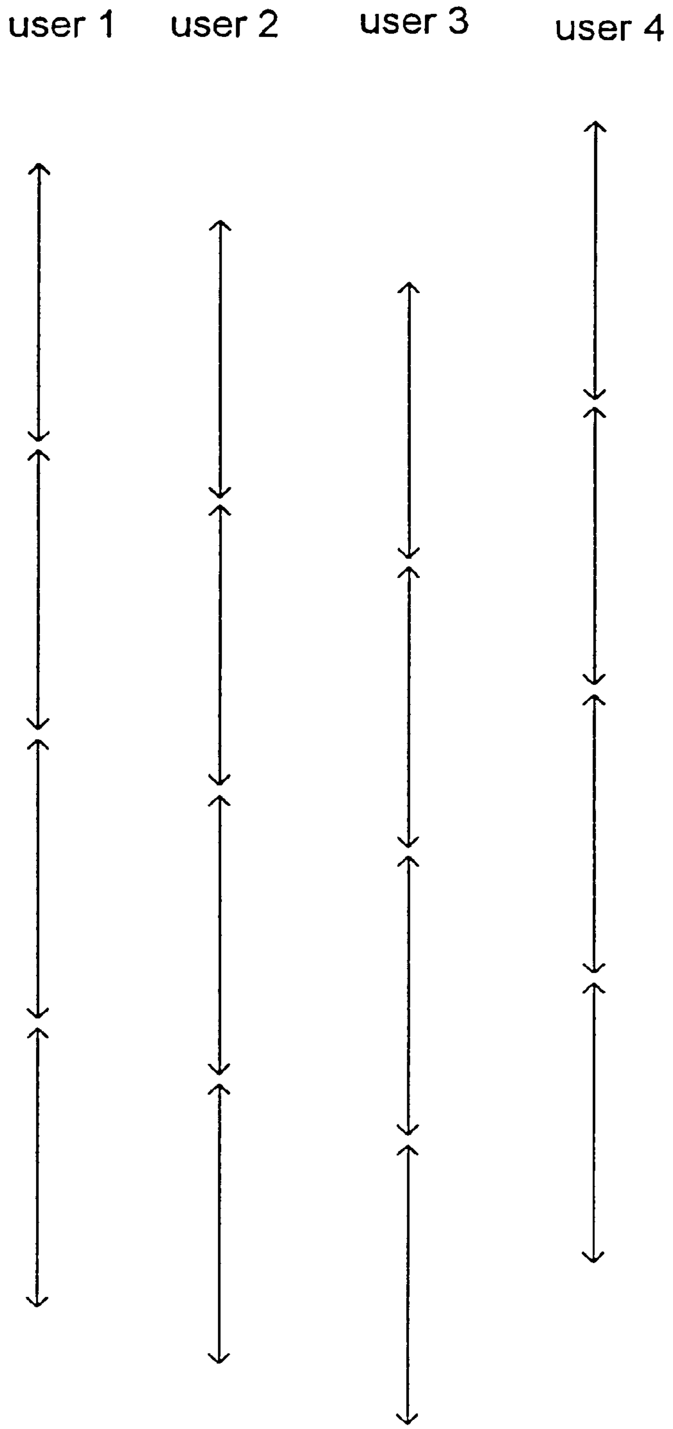
FIG. 1 is a schematic illustration of typical asynchronous signals from four users.
Figure 2:
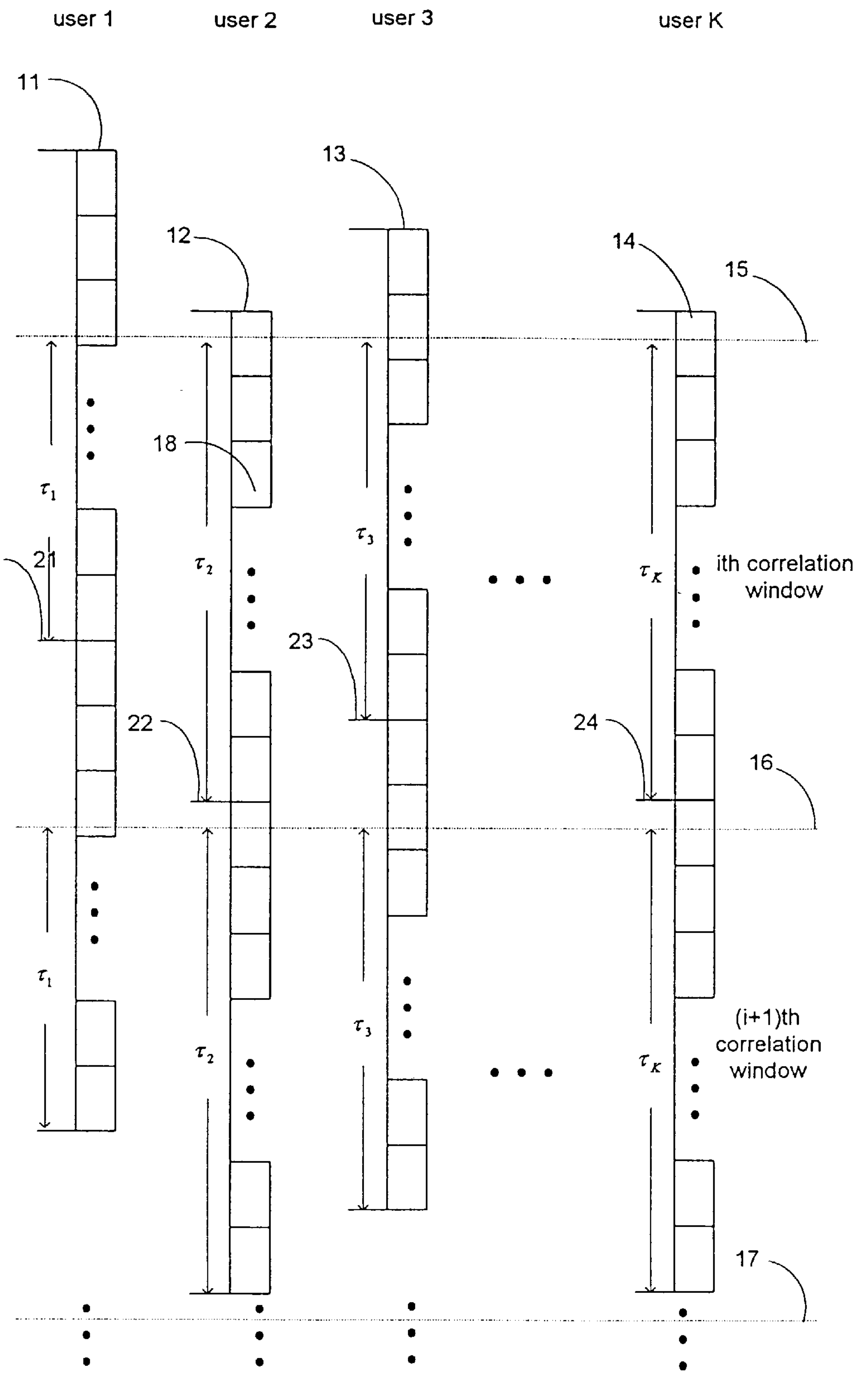
FIG. 2 is a schematic representation of typical received signals, illustrating their structure and time relationship.

Referring now to the drawings, FIG. 2 schematically represents, by way of example, a time segment of K typical user signals, 11, 12, 13 and 14 in typical mutual time relationship. Each signal consists of a sequence of values, each of duration of one chip 10. In each signal, every group of N consecutive chips constitute a symbol, conceptually demarked by inter-symbol boundaries, represented here by short lines 21, 22, 23 and 24, respectively. There is defined a window of time, to be referred to as the correlation window, whose duration T is exactly one symbol period and which is represented in the drawing by two horizontal lines 15 and 16. The starting time of the window, represented by line 15, is arbitrary. It is seen that the inter-symbol boundaries 21, 22, 23 and 24 fall at some points of time within the correlation window, at $\tau_1$, $\tau_2$ $\tau_3$, and $\tau_K$ after window start 15, respectively. The correlation window is repeated indefinitely, as shown, for example, by the additional dashed line 17.

It is noted that the relative symbol delay times $\tau$ of all signals are constant and can be obtained independently, as explained herebelow. It is also seen that for each signal, the correlation window generally includes a certain portion, to be referred to as tail portion, of one symbol and a complementary portion, to be referred to as head portion, of the next symbol, the two portions together having a total duration of one symbol. It is noted that the duration of the correlation window, T, is an integral multiple of chip duration 10; however the value of delay time $\tau$ is generally not an integral multiple of chip duration, since the correlation window start does not generally coincide with a chip boundary. It is also noted that the correlation window start time can be judicially chosen so as to minimize the number of equations to be solved, as will be explained.

The following symbology will be used herebelow: $s_k$ is the signature sequence of the kth user, corresponding to the kth signal being received. $b_k(i)$ is the (binary) value of the ith symbol of user's k signal. In the following discussion we associate the ith correlation window with the head portion of symbol i of each user's signal. Accordingly, the portion of a signal k appearing first within the ith correlation window is the tail portion of symbol i−1, which carries the information value $b_k(i-1)$, while the second portion within the correlation window is the head portion of symbol i, which carries the information value $b_k(i)$.

Figure 3:
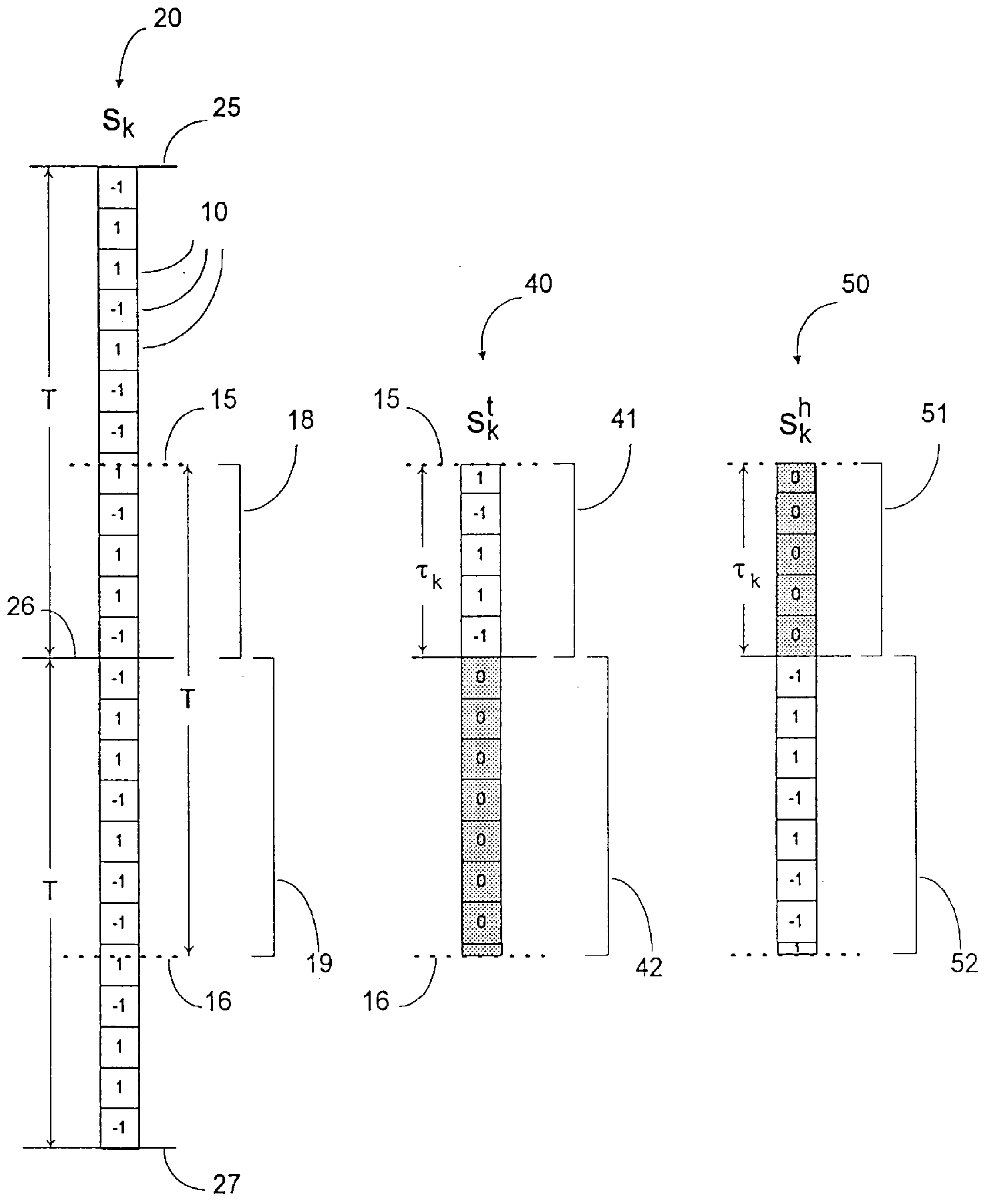
FIG. 3 is an illustration of signature sequences for user k, according to the present invention.

We now turn to FIG. 3, which illustrates, by way of example, typical signature sequences for user k. In this example, the duration T of each signature sequence is 12 chip durations. At the left side of the drawing, depicted as a sequence 20, there are shown two successive repetitions of the original sequence, $s_k$. Each repetition, consisting of 12 chips 10, coincides with a corresponding symbol of user k in the received signal and is demarked by successive intersymbol boundaries 25, 26 and 27. Also shown on this drawing, in proper time relation to the inter-symbol boundaries, are the starting point 15 and ending point 16 of the correlation window. The duration of time between the start 15 of the correlation window and the next subsequent inter-symbol boundary 26 (which, in this example, is a little less than the duration of 5 chips) is denoted by $\tau_k$.

We define, for each user k, a pair of partial signatures, namely a tail partial sequence $s_k^t$, depicted in the drawing as sequence 40, and a head partial sequence $s_k^h$, depicted as sequence 50, each of duration T (12 chip durations in the example) as follows: The first portion 41 of $s_k^t$, of duration $\tau_k$, is identical to the last (tail) portion 18 of $s_k$ of duration $\tau_k$ while the rest of $s_k^t$ (shown shaded) 42 is uniformly zero; complementarily, the first portion 51 of $s_k^h$, also of duration $\tau_k$, is uniformly zero, while its last portion 52, of duration $T-\tau_k$, is identical to the first (head), equally long, portion 19 of $s_k$. For a total of K users, corresponding to K signature sequences, there are, thus, 2K partial sequences. It is again noted that the duration $\tau_k$ is, in general, not an integral multiple of chip duration; therefore, the first and last value of each partial sequence generally have a duration of less than one chip each. It is further noted that the value of $\tau_k$ is not a-priori known, but is obtained, as an estimate, in a separate process (to be explained below) and, as such, is denoted by $\langle\tau_k\rangle$. In what follows all estimated values will be enclosed in angled brackets. Moreover, values computed from such estimated values will also be considered as estimates and thus be enclosed in angled brackets. For example, the partial sequence values $s_k^t$ and $s_k^h$ depend on $\tau_k$; hence, using $\langle\tau_k\rangle$ we can obtain only estimates for them, i.e., $\langle s_k^t\rangle$ and $\langle s_k^h\rangle$.

As noted in the background section, the relative timing (or symbol delays) of the user signals can be independently estimated from specially transmitted periodic training bursts. Alternatively, for MPSK signals, the relative timing can be acquired from the main (received) signal by correlating it with all the (full) signature sequences and integrating the K outputs over several symbol periods. Specifically, for user k, the main signal is correlated with the kth signature, $s_k$, at a continuously varying time relationship over a large number of symbol periods; the resulting absolute values are summed up for each possible value of t over all symbol periods (that is—all values obtained at times T apart); the value of t corresponding to the maximum sum is taken as the kth symbol delay.

Each received user signal can be expressed within the ith correlation window in terms of the corresponding partial sequences as $$a_k(b_k(i-1)s_k^t+b_k(i)s_k^h)$$

where $a_k$ is the complex amplitude of the kth user received signal. The totality of the K signals within the correlation window can then be written as a vector of 2K elements, which consists of two components, of K elements each:

$$a_k\left(\sum_{k=1}^{K} b_k(i-1)S_k^t + \sum_{k=1}^{K} b_k(i)S_k^h\right)$$

According to the present invention, the total signal is correlated with the estimated partial sequences of all current users, by means of K pairs of correlators, where the kth pair of correlators has, as multiplying vectors, the corresponding tail- and head partial sequences $\langle s_k^t\rangle$ and $\langle s_k^h\rangle$. These ideally yield, at the end of each correlation window time, a vector Y(i) of correlation values where $$Y(i)=\begin{pmatrix} Y^t & (i) \\ Y^h & (i) \end{pmatrix}$$

where $Y^t(i)$ and $Y^h(i)$ are each a K×1 dimensional vector.

We next define a 2K×2K estimated correlation matrix $\langle R\rangle$, composed of the cross-correlation values between all 2K (estimated) partial sequences $$[\langle s_k^t\rangle,\ \langle s_k^h\rangle],\ k=1, \ldots, K.$$

The matrix $\langle R\rangle$ can be written in terms of four component matrices as follows:

$$\langle R\rangle=\begin{pmatrix} \langle R^{tt}\rangle & \langle R^{th}\rangle \\ \langle R^{ht}\rangle & \langle R^{hh}\rangle \end{pmatrix}$$

where each component matrix is K×K dimensional.

It can be shown mathematically that multiplying the matrix R by the following information carrying vector $$col\Big[\underbrace{a_1b_1(i-1), \ldots, a_Kb_K(i-1)}_{\text{tail}},\ \underbrace{a_1b_1(i), \ldots, a_Kb_K(i)}_{\text{head}}\Big]$$

yields the same vector Y (i) of correlation values as would be obtained from the correlators, as described above, provided that all the symbol delay values $\tau_k$ are known exactly and that there is no additive noise. The above information carrying vector can be written compactly as:

$$\begin{pmatrix} A*B(i-1) \\ A*B(i) \end{pmatrix}$$

where $$A=col[a_1, \ldots, a_k],$$

$$B(i-1)=col[b_1(i-1), \ldots, b_K(i-1)]$$

$$B(i)=col[b_1(i), \ldots, b_K(i)]$$

and the symbol * denotes element-by-element product; the $a_k$'s are generally complex numbers.

In actuality, the outputs of the correlators will also contain noise components, which are due to noise in the received signals and to errors associated with the estimation of the $\tau_k$'s. The 2K correlation outputs Y can then be expressed as $$\begin{pmatrix} Y^t(i) \\ Y^h(i) \end{pmatrix} = R\begin{pmatrix} A*B(i-1) \\ A*B(i) \end{pmatrix} + \begin{pmatrix} N^t(i) \\ N^h(i) \end{pmatrix} \quad [1]$$

where the N's are the vectors of correlator output noise values.

The above expression constitutes a set of 2K equations. These should be solved for the unknowns of interest, which, as eventual estimated solutions, are denoted by the vectors $\langle A^*B(i-1)\rangle^t$ and $\langle A^*B(i)\rangle^h$. The superscripts here indicate that the first vector of estimated solutions is obtained from the tail sequences and the second vector—from the head sequences. A preferred method for optimal solution of the equations will now be discussed. Such a solution, directed at minimum mean square error (MMSE), is obtained by a decorrelation operation $$\begin{pmatrix} \langle A*B(i-1)\rangle^t \\ \langle A*B(i)\rangle^h \end{pmatrix} = (\langle R\rangle + \langle\sigma^2\rangle I)^{-1}\begin{pmatrix} Y^t(i) \\ Y^h(i) \end{pmatrix} \quad [2]$$

where the inverse matrix, to be referred to as the decorrelation matrix, is the inverse of the estimated cross-correlation matrix $\langle R\rangle$ plus a diagonal matrix $\langle\sigma^2\rangle$ W, of dimension 2K×2K). W is given by $$W=\text{diag}(|\langle A_1\rangle|^{-2}, \ldots, |\langle A_K\rangle|^{-2}, |\langle A_1\rangle|^{-2}, \ldots, |\langle A_K\rangle|^{-2})$$

and $\langle\sigma^2\rangle$ is the estimated variance of the additive white noise that accompanies the received signal.

As a typical solution of the correlation equations, the decorrelation operation yields at the end of the ith correlation window partially estimated values for the (i−1)st symbols and the ith symbols, based on the partial sequences correlation-decorrelation (as denoted by the respective superscripts). Each full symbol value (which consists of its information value and the complex amplitude of its received signal) is then estimated by a weighted averaging of the two corresponding partially estimated symbol values from the pair of successive correlation windows that the symbol straddles; that is—the value of symbol i is obtained from the head-based estimate derived in the ith correlation window and the tail-based estimate derived in the (i+1)st correlation window. Thus, for the kth user $$\langle a_k b_k(i)\rangle = \left(1 - \frac{\langle\tau_k\rangle}{T}\right)\langle a_k b_k(i)\rangle^h + \frac{\langle\tau_k\rangle}{T}\langle a_k b_k(i)\rangle^t \quad [3]$$

where $\langle\tau_k\rangle$ is the estimated relative symbol delay time for user k, T is, as noted, the duration of a symbol, as well as of a correlation window, and $\langle a_k b_k(i)\rangle^h$ and $\langle a_k b_k(i)\rangle^t$ are obtained from the ith and (i+1)st correlation windows, respectively.

Finally, the estimated message value of the symbol, $\langle b_k(i)\rangle$, is estimated and extracted as the usable detected information, by dividing the previously obtained result, $\langle a_k b_k(i)\rangle$, by the complex amplitude, $\langle a_k\rangle$, which, as was noted, has been independently estimated. In the particular case of phase modulated symbols, the amplitude need not be known and the latter operation amounts to correcting only the phase of the obtained complex value. For example for biphase modulated signals this operation is equivalent to discriminating between positive and negative values; thus, the estimated binary symbol value is $$\langle b_k(i)\rangle=\text{sign}[\text{real}[exp(-j\ \text{angle}(a_k))\langle a_k b_k(i)\rangle]] \quad [4]$$

where $j=\sqrt{-1}$.

It is noted that this method, in effect, converts the detection problem from an asynchronous case to a synchronous case and thus has the advantage of having an optimum solution with no loss in data, as pointed out in section 4 of the reference article by Verdu. In other words, the BER due to cross-user interference is practically reduced to zero; the only remaining BER is that due to received noise and to errors in estimating the parameters $a_k$ and $\tau_k$. The main and most significant advantage of the disclosed method is that such reliable detection is achieved with much less computational effort than in methods of prior art: There are only 2K unknowns to solve for (compared to MK in the method described in the background section) and a 2K×2K decorrelation matrix (compared to MK×MK). Furthermore, in contrast to prior art methods, here no received data are ignored and there is no need to overlap successive correlation windows.

It is further noted that, in similarity with decorrelation methods of prior art, periodically the complex amplitude- and symbol boundary delay parameters of all received user signals must be estimated (e.g. by a preprocessor) and a new decorrelation matrix must be computed accordingly. Preferably the decorrelation matrix is based only on the users actually being received from; therefore, usually the parameters of only the users that have been added since the last computation need be estimated (unless the parameters of currently active users have changed), while those of the users that have ceased transmission must be dropped. In any case, as noted above, the decorrelation matrix has, in the presently disclosed method, a size of only 2K×2K and is thus easier to compute than with methods of prior art. Similarly, a pair of correlators needs to be reloaded with new values for each of the users that have been added since the last computation. It is further noted that the number of actual computations needed is practically even smaller than implied by the above, since half the elements in the partial sequences are zero—obviating their multiplication operations, and since generally the correlation matrix is sparse.

The size of the decorrelation matrix can practically be reduced even further, by neglecting partial sequences with very short non-zero segments—which occur when the symbol boundary of any user signal falls very near the correlation window boundary. Thus when the delay $\langle\tau_k\rangle$ of user k is less than a certain threshold value $\tau_{th}$, the corresponding tail sequence may be neglected, while the head sequence remains unchanged; similarly, when $T-\langle\tau_k\rangle$ is larger than $T-\tau_{th}$, the corresponding head sequence may be neglected, while the tail remains unchanged. For each such occurrence, the number of unknowns in equations [1] and [2], and therefore also the number of active correlators and decorrelators and each dimension of the decorrelation matrix, is reduced by one. Furthermore, the phase (i.e. exact timing) of the correlation window boundaries may be chosen so that, for a particular value of $\tau_{th}$, the number of $\langle\tau_k\rangle$'s, among all active users, that are within the intervals $[0, \tau_{th}]$ and $[T-\tau_{th}, T]$ is maximal, thus minimizing the number of unknowns. In addition to the reduction in the number of required computations, the matrix inversion operation also becomes more stable, since there are fewer very small divisors. The only disadvantage is, of course, a slight loss of information, resulting in some increase of the BER that is usually negligible for $\tau_{th}$ sufficiently small.

Figure 4:
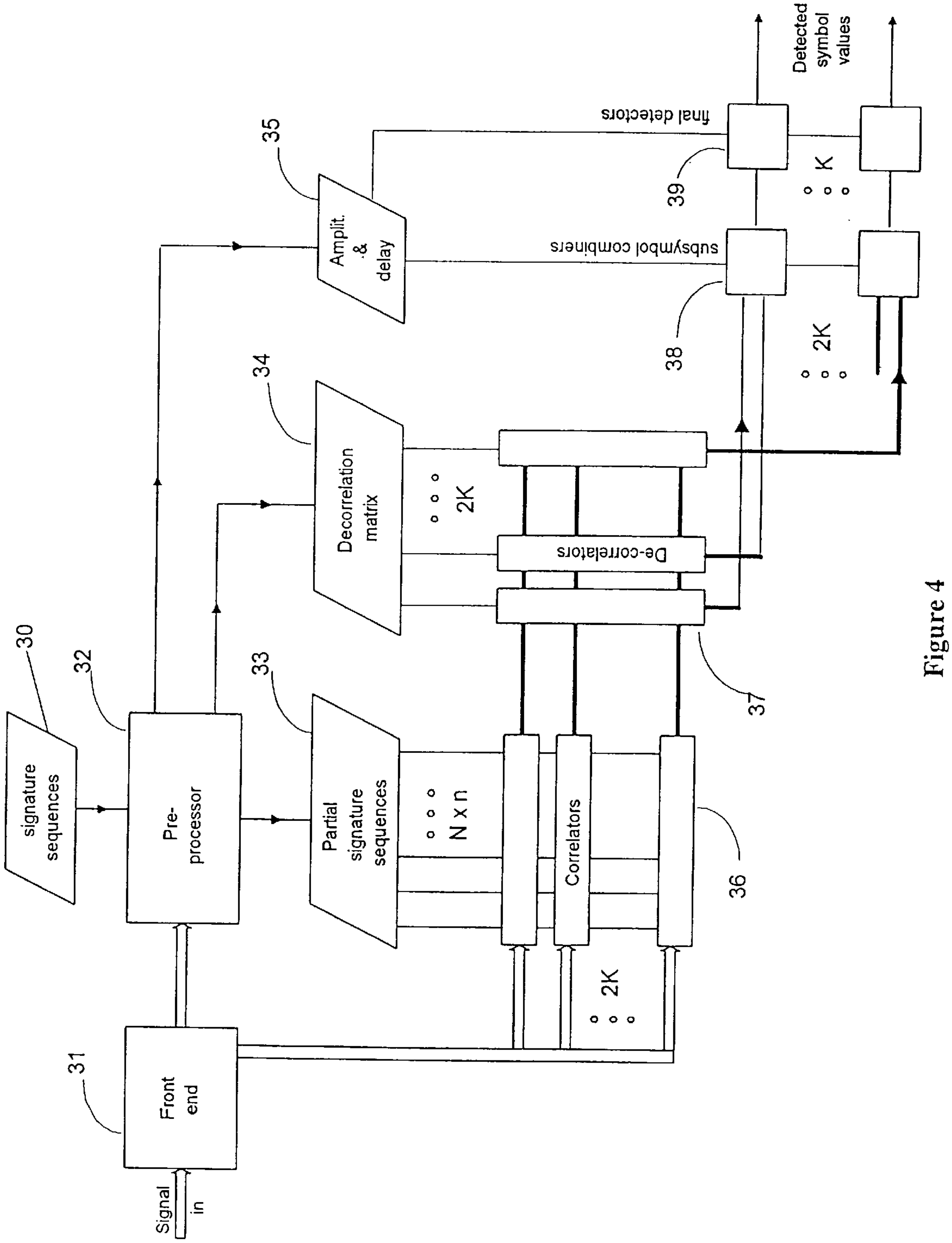
FIG. 4 is a block diagram of a preferred embodiment of the present invention.

A preferred embodiment of the method according to the present invention is shown, as a block diagram, in FIG. 4. Although this embodiment is applicable to a variety of signal formats (including analog signals), a digital format is preferred and is assumed in what follows. The format consists of digitized samples, where the sampling rate is higher than the chip rate; specifically there are n samples within the span of each chip, where n is typically between 2 and 4.

The received signal is applied to a front end 31, which transforms it to base band and which includes a signal sampler and an analog-to-digital converter. The output signal of the front end is fed to a pre-processor 32, which monitors the active sub-channels in the received signal and extracts relevant parameters and data, using stored user signature sequences from a long-term memory 30, as will be explained herebelow. The pre-processor outputs the data and temporarily stores them respectively in three memories—one, 33, for partial signature sequences, one, 34, for decorrelation matrix and one, 35, for the user estimated amplitude and delay parameters. The first two memories are matrix oriented, of nominal size 2K×N×n and 2K×2K, respectively. The output signal of the front end 31 is also fed identically to a bank of 2K correlators (or, more precisely, vector inner-product calculators) 36.

Figure 5:
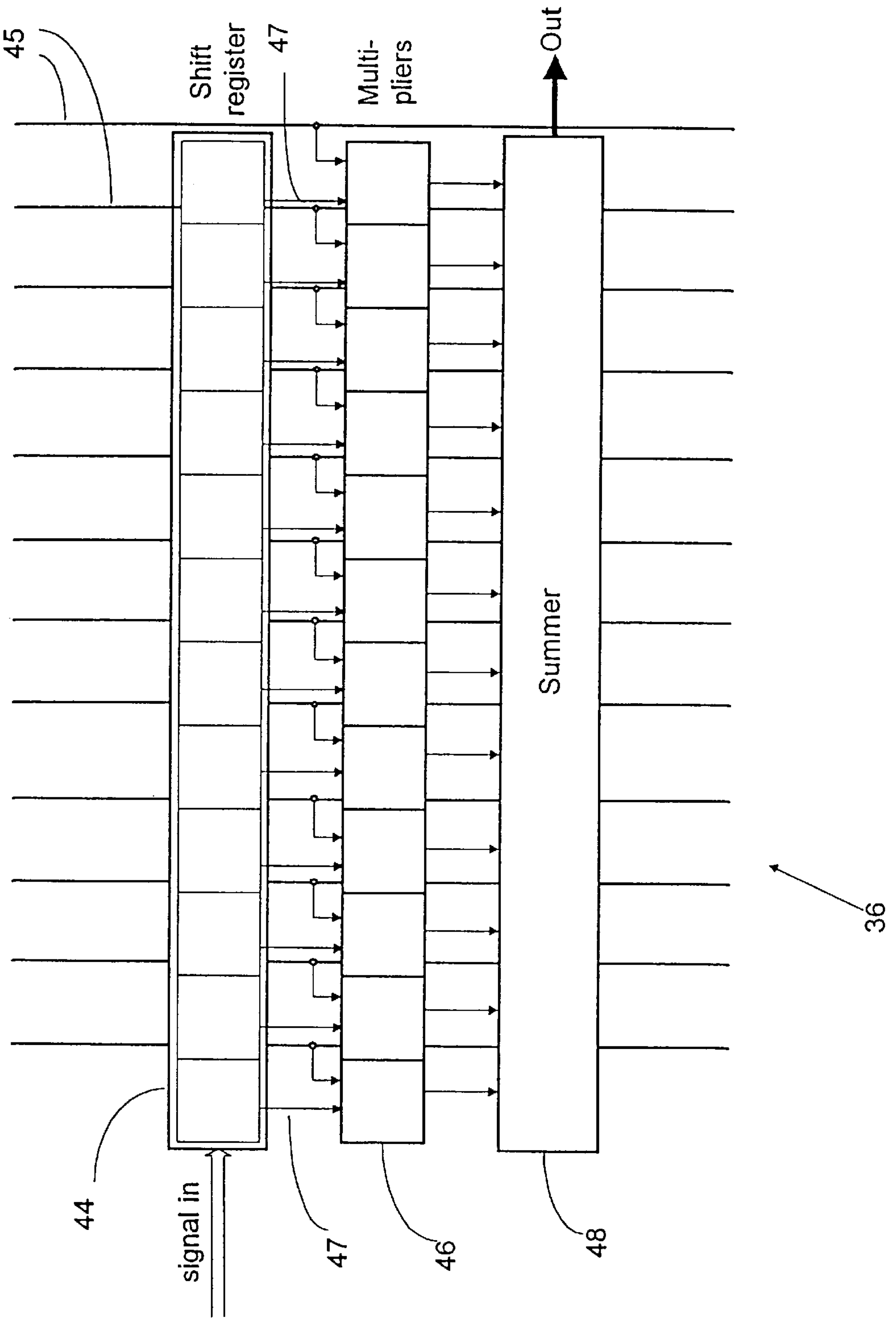
FIG. 5 is a detailed block diagram of one configuration of a correlator in the preferred embodiment of FIG. 4.

A typical correlator 36 is shown, as a block diagram in FIG. 5, where it is seen to include a shift-register 44, N×n multipliers 46 and a summer 48. The N×n multiplying factors for all multipliers in each correlator 36 (which constitute the n samples of each of the N chips of the corresponding partial signature sequence) are fed from store 33; in the configuration shown, the factors are fed to their respective correlators through N×n bus lines 45; in an alternative configuration, the partial signature sequences store 33 is associated with the bank of correlators 36, so that each partial signature sequence is directly fed to the multipliers of the corresponding correlator; in any case, the multiplying factors change relatively infrequently. It is noted that essentially half of the multiplying factors are zero (because of the structure of the partial signature sequences); this fact can be utilized advantageously in some hardware architectures that provide dynamic processor allocation. The input signal is applied to shift-register 44, which is N×n samples long, where it is shifted in real time. At the end of each correlation window, the samples are read out and applied, as multiplicands 47, to the respective multipliers and the resulting products are added together in summer 48.

Returning now to FIG. 4, the summer output of each correlator 36 is temporarily stored and put on a bus line that is connected to a bank of 2K decorrelators 37. Each decorrelator includes 2K multipliers and a summer. The multiplicand for each multiplier is fed from a bus line that carries the output of the corresponding correlator 36. The respective multiplying factor for all multipliers in a decorrelator 37 are fed from a corresponding column of the decorrelation matrix stored in 34; in the configuration shown, each decorrelator 37 also has a bus line, through which the multiplying factors are distributed to their respective multipliers; in an alternative configuration, the decorrelation matrix store 34 is associated with the bank of decorrelators 37, so that each value of the matrix is directly fed to the corresponding multiplier. The summer outputs of each pair of decorrelators 37 that relate to one user are fed to a corresponding one of a bank of K symbol combiners 38. The outputs of the latter are, in turn, applied respectively to K final detectors 39. Combiners 38 and final detectors 39 receive respective parameter values, over a bus, from amplitude and delay storage 35. The outputs of final detectors 39 are the estimated symbol values.

It is appreciated that blocks marked as specific stores may, in reality, belong to one or more common physical memory devices and that blocks marked as specific processors, including correlators and decorrelators, may, in reality, be implemented as, or within, one or more common processors. It is also appreciated that the apparatus, in reality, includes additional blocks, such as timers, registers and control units, necessary for its proper operation, in a manner well known to practitioners of the art. It is further appreciated that the number of active users, K, as affecting the calculations, varies all the time, whereas the number of processing units (such as correlators) in any given system, as indicated by K or 2K in FIG. 4, is usually constant and represents the maximum number of users whose signals can be simultaneously detected.

Operation of the apparatus of FIG. 4 will now be explained.

Received signal is continuously demodulated in front-end 31, sampled and digitized, then fed, as input signal, to pre-processor 32 and to correlators 36. Preprocessor 32 periodically monitors the active sub-channels in the received signal and, for each such active sub-channel, it extracts a close estimate of its complex amplitude $a_k$ and the symbol delay $\tau_k$, storing these two variable estimates in store 35. Also, periodically, using the pertinent signature sequences from those stored in store 30 and the estimated symbol delay values, preprocessor 32 generates partial signature sequences for newly detected active users and adds them to those stored in store 33, while deleting those of newly deactivated users. At the same time, preprocessor 32 computes a new decorrelation matrix, which it stores in store 34. Also the number of active processing units, such as correlators, whose operation is explained in what follows, is adjusted accordingly. All the above periodic computations are usually carried out in batches, one batch each period, at which times the various stores are updated.

At every correlation window boundary, each active correlator 36, in a manner such as explained hereabove, multiplies a segment of duration T of the input signal (received from front-end 31), sample-by-sample, by a corresponding partial signature sequence from store 33 and sums all multiplication products. The summer's output (which represents the current correlation value) is stored. These stored values are fed, over the bus lines, as multiplicands to all decorrelators 37, which continuously obtain corresponding decorrelation matrix values from store 34 as multiplying factors. Multiplication takes place in all multipliers of decorrelators 37 following each new output from correlators 36 (that is, at the end of each correlation window), whereupon the products in each decorrelator are summed and the sum (which is a partially estimated symbol value) is fed to a corresponding symbol combiner 38. Each symbol combiner receives the outputs of the two decorrelators associated with the corresponding user, namely those that yield the corresponding head-sequence based estimated symbol value and tail-sequence based estimated symbol value, respectively; it delays the head-sequence based value by one symbol period (i.e. by one input time), and combines the two values according to expression [3] hereabove, yielding the value $<a_k b_k(i)>$. The latter is fed to a corresponding final detector 39, which in the case of binary symbols, performs on it the operation represented by expression [4] hereabove and outputs the result as the estimated message value for the symbol. Both symbol combiner 38 and final detector 39 continuously obtains the appropriate amplitude and delay parameter values from store 35. The stream of estimated message values, output by final detector 39, constitutes the received information.

Figure 6:
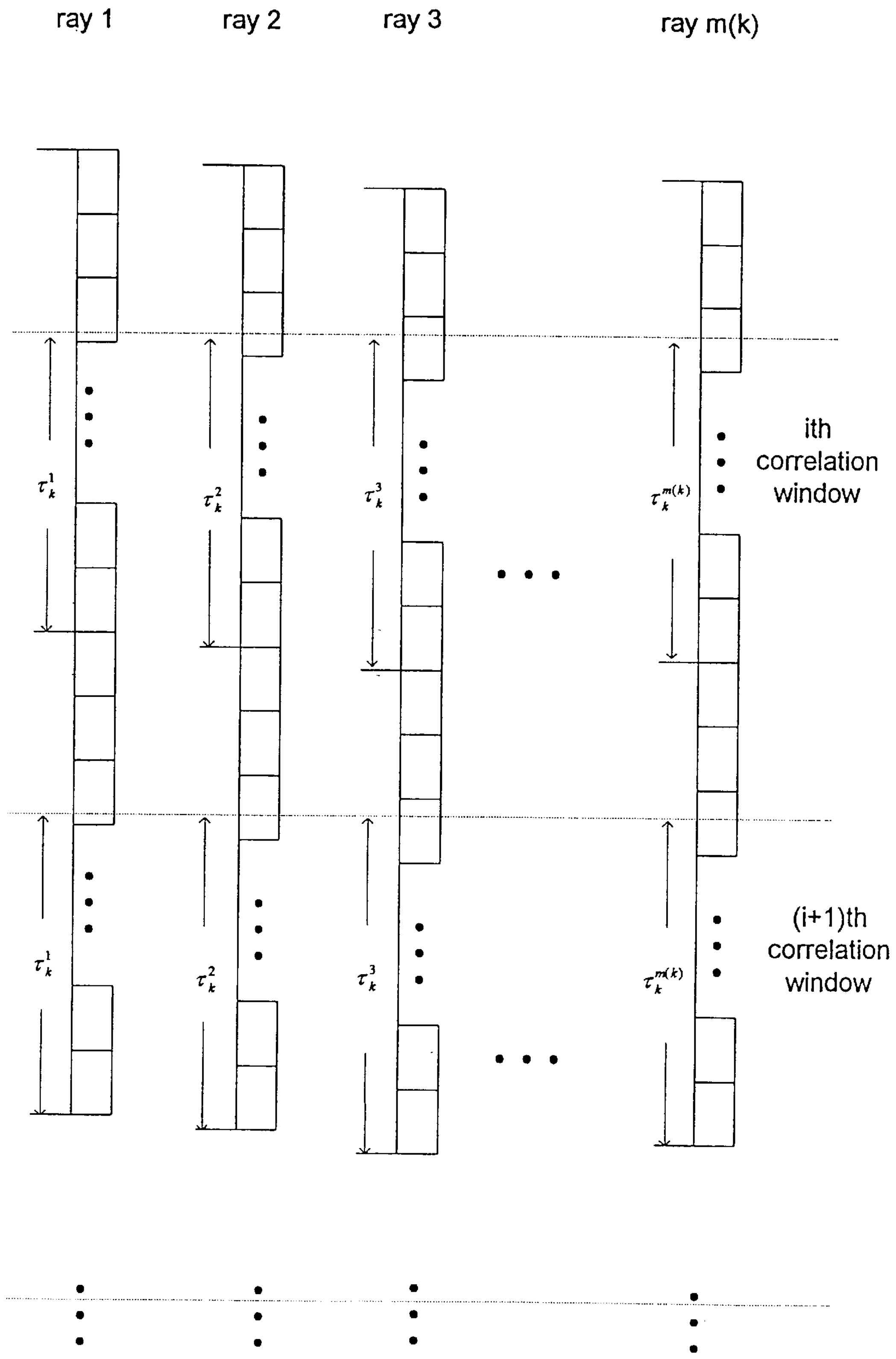
FIG. 6 is a schematic representation of a typical received signal and its specular multipath components, illustrating their structure and time relationship.

In a more general reception situation, any or each of the signals sent by the remote stations may be received over a plurality of paths (also known as rays), e.g. a direct path and paths created by specular reflections, whereby it undergoes different delay and (generally complex) attenuation over each path. The time relationship between the signals of user k arriving over m(k) distinct paths in a typical case is depicted schematically in FIG. 6, where ray 1 always denotes the direct path, if it exists. A signal arriving over any single path will be referred to as a subsignal. The subsignals arriving from user k over the various paths will be referred to as components of signal k. If the range of the delay values, modulo T, of all components is much smaller than a symbol duration, the method of the present invention, appropriately modified yet preserving the number of 2K unknowns, can provide full detection also under these circumstances, as follows: The two partial sequences for user k, whose signal arrives over m(k) distinct paths, are computed basically as a sum of the partial sequences appropriate to their various delays, weighted by their respective amplitudes. The delay and amplitude of the signal from each path (i.e. of each component of signal k) are estimated in a pre-processor in a manner essentially similar to that described hereabove. The rest of the process (including computation of the decorrelation matrix) is identical to that described hereabove.

More specifically, if the estimated delays and complex amplitudes of the m(k) components of signal k are $$<\tau_k^1>, <\tau_k^2>, \ldots, <\tau_k^{m(k)}> \text{ and } <\alpha_k^1>, \ldots, <\alpha_k^{m(k)}>,$$

then the estimated head- and tail partial sequences are determined, respectively, by the expressions $$\langle S_k^t\rangle = \sum_{m=1}^{m(k)} \langle a_k^m\rangle r_k^t(m),$$

$$\langle S_k^h\rangle = \sum_{m=1}^{m(k)} \langle a_k^m\rangle r_k^h(m),$$

where the first segment of each of the component tail partial sequences $r_k^t(m)$ is identical to the tail portion of the corresponding signature sequence from $T-<\tau_k^1>$ to T, in the case of m=1 (usually corresponding to the direct path), and from $T-<\tau_k^m>$ to $T-<\tau_k^m>+<\tau_k^1>$, in the cases of m=2, . . . , m(k), and the last segment, of complementary duration, is uniformly zero; and the last segment of each of the component head partial sequences $r_k^h(m)$ is identical to the head portion of the corresponding signature sequence from 0 to $<\tau_k^1>$, in the case of m=1 and from 0 to $<\tau_k^m>$, in the cases of m=2, . . . , M, and the first segment, of complementary duration, is uniformly zero.

It is appreciated that the above expressions can be modified, in an obvious manner, to also include cases in which some of the delay values are close to zero while others are close to T (which cases occur owing to the arbitrariness of the timing of the correlation window boundaries). The delays and amplitudes of the multipath signal components are estimated in a manner similar to that of the single path signal.

A component signal due to reflection may also undergo a Doppler shift, if the reflector is moving. In this case, the above expressions for the partial sequences are modified to become $$\langle S_k^t\rangle = \sum_{m=1}^{m(k)} \langle a_k^m\rangle \exp(j2\pi\langle f_k^m\rangle t) r_k^t(m),$$

$$\langle S_k^h\rangle = \sum_{m=1}^{m(k)} \langle a_k^m\rangle \exp(j2\pi\langle f_k^m\rangle t) r_k^t(m),$$

where t in the exponents denotes time and $<f_k^m>$—the estimated Doppler shift of the mth path of user k. The time t is set to zero at the start of the first correlation window. The component partial sequences remain as defined above.

Throughout the discussion hereabove it was assumed that the signature sequence of each active user is constant with time. In certain applications it may be desirable to change the signature for any user from time to time, possibly even from symbol to symbol. It would then be neccessary to modify the methods of the present invention, so as to accommodate such time variation. Such modification seems to be possible.

While the invention has been described with respect to a limited number of embodiments, it will be appreciated that many variations, modifications and other applications of the invention may be made.

What is claimed is:

1. A method for detecting transmitted messages in signals received in one receiver from a plurality of users within a CDMA transmission system, each user being characterized by a unique one of a plurality of signature sequences, all the signature sequences having an equal and constant duration T, each received signal consisting of consecutive symbols, each being of duration T and carrying a message value, the points of time of the beginning and end of each symbol constituting symbol boundaries, each received signal being associated with a complex amplitude and a delay, the delay being the time span between a common arbitrary point of time and a symbol boundary, and the received signals, in addition to reception noise, collectively forming a total received signal, the method comprising the steps of:

(a) defining a temporal sequence of consecutive correlation windows of duration T each, the beginning and end of each correlation window constituting correlation window boundaries;

(b) detecting, within the total received signal, signals sent by users, each detected signal being identified in terms of its signature sequences and associated with a corresponding user, this user being an active user;

(c) for each of said detected signals, deriving from the total received signal an estimated symbol delay, $<\tau>$, associated with the corresponding active user, said estimated symbol delay being the estimated duration of time from any one of said correlation window boundaries to the next occurring symbol boundary;

(d) partitioning each signature sequence that corresponds to one of said active users exactly into a head portion and a tail portion, the head portion preceding the tail portion and the duration of the tail portion being essentially equal to the corresponding one of said estimated symbol delays;

(e) constructing for each of said active users a pair of partial sequences of duration T each, one of said partial sequences being a tail sequence and the other one being a head sequence, each of said partial sequences consisting of a leading portion and a succeeding trailing portion, whereby the leading portion of said tail sequence is essentially identical to said tail portion of the corresponding signature sequence, the trailing portion of said head sequence is essentially identical to said head portion of the corresponding signature sequence and the other portion of each of said partial sequences is uniformly zero;

(f) for each of said active users, correlating the total received signal, over the span of each of said correlation windows, with one or both of the corresponding pair of said partial sequences, the result being one or two corresponding series of correlation values; and (g) calculating from said correlation values, obtained for a plurality of users, estimated message values of symbols in received signals corresponding to one or more of said active users.

2. The method of claim 1, further comprising the step of comparing, for each of said active users, said estimated symbol delay, $<\tau>$, and its complement, $T-<\tau>$ with a threshold value, $\tau_{th}$, and wherein in step 'f', said one or both of the corresponding pair of said partial sequences consists of said head sequence only, if $<\tau><\tau_{th}$, said tail sequence only, if $<\tau>>T-\tau_{th}$, or both partial sequences, otherwise.

3. The method of claim 1, wherein in step (g), for each active user for whom in step 'f' said one or both is both, said calculating includes, for each symbol in the corresponding received signal, the substeps of (i) calculating two partially estimated symbol values, one of said partially estimated symbol values, it being a tail estimated value, being calculated from those of said correlation values that are obtained from correlation with tail sequences and the other one of said partially estimated symbol values, it being a head estimated value, being calculated from those of said correlation values that are obtained from correlation with head sequences; and (ii) weight-averaging said two partially estimated values.

4. The method of claim 3, wherein in substep 'ii', weight-averaging includes giving to said tail estimated value a weight essentially equal to $<\tau>/T$ and to said head estimated value—a weight essentially equal to $1-<\tau>/T$.

5. The method of claim 3, further comprising the step of constructing a decorrelation matrix based on said partial sequences and wherein in substep (i) of step (g) said calculating includes multiplying said correlation values by appropriate elements of said decorrelation matrix.

6. The method of claim 1, further comprising the step of constructing a decorrelation matrix based on said partial sequences and wherein in step (g) said calculating includes multiplying said correlation values by appropriate elements of said decorrelation matrix.

7. The method of claim 6, wherein said step of constructing a decorrelation matrix includes the sub step of estimating the level of the reception noise, calculating therefrom a noise decorrelation element and adding said noise decorrelation element to elements of said decorrelation matrix.

8. The method of claim 1, further comprising the step of deriving from the total received signal, for any of said active users, an estimated amplitude, associated with the corresponding received signal, and wherein in step (g) said calculating includes dividing by the corresponding one of the thus estimated amplitudes.

9. The method of claim 8, wherein said amplitude is complex amplitude.

10. The method of claim 1, wherein in step 'c' said deriving includes the substeps of (i) obtaining consecutive samples of the total received signal over a plurality of symbol durations, the spacing of said samples being a sufficiently high sub-multiple of T;

(ii) obtaining samples of the corresponding signature sequence at a spacing equal to that of the samples of substep 'i';

(iii) deriving a sampled correlation function between the samples of substep 'i' and the samples of substep 'ii' for all possible time relations therebetween;

(iv) summing all samples of said correlation function that are spaced exactly T apart, for all possible time relations between said samples and any of said correlation windows; and (v) determining the particular one of the time relations of substep 'iv' for which said sum is greatest.

11. The method of claim 2, wherein the absolute time of any of said correlation window boundaries is chosen so that for each of a substantial number of said active users, the corresponding value of $<\tau>$ is either between 0 and $\tau_{th}$ or between $T-\tau_{th}$ and T.

12. A method for detecting transmitted messages in signals received in one receiver from a plurality of users within a CDMA transmission system, the signal received from at least one user arriving with significant strength over a plurality of paths of unequal lengths, the signal arriving from any one user over any one path constituting a subsignal, each user being characterized by a unique one of a plurality of signature sequences, all the signature sequences having an equal and constant duration T, each received subsignal consisting of consecutive symbols, each being of duration T and carrying a message value, the points of time of the beginning and end of each symbol constituting symbol boundaries, each received subsignal being associated with a complex amplitude and a delay, the delay being the time span between a common arbitrary point of time and a symbol boundary, and the received subsignals collectively forming a total received signal, the method comprising the steps of a) determining a temporal sequence of consecutive correlation windows of duration T each, the beginning and end of each correlation window constituting correlation window boundaries;

b) identifying users in terms of their signature sequences, each thus identified user being an active user;

c) for each of said active users, deriving from the total received signal an estimated complex amplitude and an estimated symbol delay, associated with each corresponding received subsignal, said estimated symbol delay being the estimated duration of time from any one of said correlation window boundaries to the next occurring symbol boundary;

d) for each of said active users and each of the corresponding ones of said subsignals, dividing the corresponding signature sequence exactly into a head portion and a tail portion, the head portion preceding the tail portion and the duration of the tail portion being essentially equal to the corresponding one of said estimated symbol delays;

e) for each of said active users and each of the corresponding ones of said subsignals, constructing a pair of component partial sequences of duration T each, one of said component partial sequences being a component tail sequence and the other one being a component head sequence, each of said component partial sequences consisting of a leading portion and a succeeding trailing portion, whereby the leading portion of said component tail sequence is essentially identical to said tail portion of the corresponding signature sequence, the trailing portion of said component head sequence is essentially identical to said head portion of the corresponding signature sequence and the other portion of each of said component partial sequences is uniformly zero;

f) for each of said active users, constructing a pair of partial sequences of duration T each, one of said partial sequences being a tail sequence and the other one being a head sequence, by appropriately combining all corresponding ones of said component partial sequences;

g) for each of said active users, correlating the total received signal, over the span of each of said correlation windows, with one or both of the corresponding pair of said partial sequences, the result being one or two corresponding series of correlation values;

h) calculating from said correlation values, obtained for a plurality of users, estimated message values of symbols in received signals corresponding to one or more of said active users.

13. The method of claim 12, wherein at least one of the paths has a continuously varying length and wherein step 'c' also includes deriving an estimated Doppler frequency shift.

14. Apparatus for detecting transmitted messages in signals received in one receiver from a plurality of users within a CDMA transmission system, each user being characterized by a unique one of a plurality of signature sequences, all the signature sequences having an equal and constant duration T, each received signal consisting of consecutive symbols, each being of duration T and carrying a message value, the points of time of the beginning and end of each symbol constituting symbol boundaries, each received signal being associated with a complex amplitude and a delay, the delay being the time span between a common arbitrary point of time and a symbol boundary, the received signals collectively forming a total received signal, the apparatus comprising:

a) a preprocessor operative to determine a temporal sequence of consecutive correlation windows of duration T each, the beginning and end of each correlation window constituting correlation window boundaries;

identify users in terms of their signature sequences, each thus identified user being an active user;

derive from the total received signal, for each of said active users, an estimated symbol delay, $<\tau>$, associated with the corresponding received signal, said estimated symbol delay being the estimated duration of time from any one of said correlation window boundaries to the next occurring symbol boundary;

partition each signature sequence that corresponds to one of said active users exactly into a head portion and a tail portion, the head portion preceding the tail portion and the duration of the tail portion being essentially equal to the corresponding one of said estimated symbol delays; and construct, for each of said active users, a pair of partial sequences of duration T each, one of said partial sequences being a tail sequence and the other one being a head sequence, each of said partial sequences consisting of a leading portion and a succeeding trailing portion, whereby the leading portion of said tail sequence is essentially identical to said tail portion of the corresponding signature sequence, the trailing portion of said head sequence is essentially identical to said head portion of the corresponding signature sequence and the other portion of each of said partial sequences is uniformly zero;

b) a correlation processor operative, for each active user whose symbols are to be detected, to inner-vector multiply the total received signal, over the span of each of said correlation windows, by one or both of the corresponding pair of said partial sequences, and to sum the products of each such multiplication, to yield a respective pair of correlation values;

c) a detection processor operative on a plurality of said correlation values to calculate therefrom estimated message values of symbols in signals received from users.

15. The apparatus of claim 14, wherein said detection processor is further operative to calculate, for any of said active users and for each symbol in the corresponding received signal, two partially estimated symbol values and to weight-average them.

16. The apparatus of claim 14, wherein said preprocessor is further operative to construct a decorrelation matrix based on said partial sequences, and wherein said detection processor is further operative to multiply said correlation values by appropriate elements of said decorrelation matrix.

* * * * *